United States Patent Office 3,038,861
Patented June 12, 1962

3,038,861
POLYCRYSTALLINE GARNET MATERIALS
Le Grand G. Van Uitert, Morris Township, Morris County, N.J., assignor to Bell Telephone Laboratories, Incorporated, New York, N.Y., a corporation of New York
No Drawing. Filed Dec. 27, 1957, Ser. No. 705,507
8 Claims. (Cl. 252—62.5)

This invention relates to a method of making improved synthetic garnet materials, and to the garnets so produced. This invention relates particularly to a method of increasing the electrical resistivity of synthetic garnets and to the materials so produced.

This application is a continuation-in-part of application Serial No. 682,574, filed September 9, 1957, now abandoned.

Substantial interest has recently been shown in the properties of a number of synthetic materials which are isostructural with naturally occurring garnet minerals. These synthetic garnets, which have the formula $A_3B_5O_{12}$, where A and B are trivalent metal ions, have magnetic properties valuable in the microwave arts, among others. For example, the synthetic garnets show very narrow line absorption at their ferromagnetic resonance frequency, and can be used in the construction of microwave devices such as resonators and isolators, and, generally, as the resonating element in other analogous waveguide structures.

In the manufacture of ceramic, that is, polycrystalline, bodies of these synthetic garnets, it has been found that in firing the bodies at the elevated temperatures preferred for reaction of the component materials therein to form a high-density product, a loss in electrical resistivity of the bodies is experienced. When using the materials in, for example, microwave apparatus, it is desirable to maintain a high electrical resistivity, preferably above $10^{12}$ ohm-centimeters, to reduce attenuation of wave energy passing through the bodies. The loss of resistivity on firing the bodies, then, is detrimental to properties desirable in the fired materials.

By the method of the present invention, up to 10 percent, by weight of all the metal ions present in the garnet, of cobalt, manganese, or nickel, or mixtures of any two or all of these, are added as compounds of the metals to the other ingredients of the ceramic synthetic garnets before firing. The presence of these compounds, which are converted to oxides during firing, maintains or raises the electrical resistivity of the fired bodies despite the fact that firing is carried out at high temperatures to achieve high densities.

The synthetic ceramic garnet materials of most interest for their magnetic properties are yttrium-iron garnets and the rare earth-iron garnets. These have the garnet structure, and the formula $A_3B_5O_{12}$, where A is yttrium, or one or more of the rare earths having an atomic number between 62 and 71 inclusive, or a mixture of yttrium with one or more of the rare-earths mentioned; B is iron, or iron substituted in part with other trivalent elements such as gallium, aluminum, scandium, indium or chromium. Useful magnetic materials are obtained when one iron atom out of 10 (10 atom percent) is substituted with these other metals. With the exception of chromium, the metals may be substituted for iron in amounts up to 20 atom percent. Hereinafter, it is understood that the term "yttrium-iron garnets" includes those materials of the aforementioned formula in which A is yttrium or yttrium mixed with one or more of the rare earths of atomic number between 62 and 71 inclusive, and B is iron, or iron mixed with gallium, aluminum, scandium, indium or chromium. The term "rare earth-iron garnets" similarly refers to synthetic garnet materials having the formula mentioned above in which A is one or more of the rare earths of atomic number between 62 and 71 inclusive, and B is iron, or iron mixed with gallium, aluminum, scandium, indium or chromium.

The lattice of the synthetic garnets will accommodate ions whose radii fall within two size ranges. Ions of yttrium and the rare earths of atomic number between 62 and 71 inclusive all have radii of approximately the same size and can interchangeably occupy the eight-fold sites in the garnet lattice. These radii are listed in the table on pages 36–37 of Inorganic Chemistry by Fritz Ephraim, Fifth English Edition by P. C. L. Thorne and E. R. Roberts, published by Gurney and Jackson, London, 1948, as being between 0.99 angstrom unit and 1.13 angstrom units. Recent work on the garnet structure indicates that the radii, as a group, may have smaller numerical values in the garnet lattice than those listed by Ephraim. Mixtures of two or more of these materials can be substituted in the lattice of the synthetic garnets.

Iron has a smaller ionic radius, and occupies the four-fold and six-fold lattice sites in the crystal. The ions of iron, gallium, aluminum, scandium, indium, and chromium are also comparable in size (given by Ephraim as between 0.57 angstrom unit and 0.83 angstrom unit, though again believed from recent work to be smaller within the garnet lattice) and can be substituted one for another in the garnet lattice.

The efficacy of additions of cobalt, manganese, or nickel, or mixtures of these, in raising electrical resistivity, is believed due to their suppression of mechanisms for easy conduction within the garnet crystal. Such a conduction mechanism may involve, for instance, electron transfer between trivalent iron and small amounts of divalent iron formed within the garnet by reduction during high temperature firing. The trivalent ions of cobalt, nickel, and manganese have greater ionization potentials than that of trivalent iron and deter the formation of divalent iron in the crystal by preferentially combining with excess electrons, preventing the easy ferrous-ferric conduction mechanism.

The effect of high temperature firing on yttrium-iron garnet, representative of the yttrium-iron and rare earth-iron garnets generally, can be seen in the following Table I, where the resistivities of an yttrium-iron garnet are presented for differing firing temperatures above 1325° C., after an earlier calcination of all samples at 1100° C. A temperature of 1325° C. is about the maximum temperature at which this material may be fired without experiencing loss in resistivity, presumably due to the reduction and conduction mechanism discussed above.

Table I

| Firing temperature: | Resistivity in ohm-centimeters |
|---|---|
| 1325° C | $7(10^{10})$ |
| 1350° C | $5(10^{10})$ |
| 1375° C | $6(10^9)$ |
| 1400° C | $6(10^8)$ |
| 1425° C | $4(10^7)$ |
| 1450° C | $1(10^6)$ |

When small amounts of cobalt, nickel, and manganese, or mixtures of these are added to the yttrium-iron garnet in the proportions herein recommended, the electrical resistivities of the materials are all above $10^{12}$ ohm-centimeters within the same firing range considered above.

Though the cobalt, manganese, or nickel are present in the final fired composition as an indeterminate mixture of the divalent and trivalent ions of these metals and are balanced electrically with oxygen ions, it is convenient to describe their concentration in the garnets in terms of the weight of the metal ions alone, ignoring the weight of any anionic species in calculating. Thus, according to the invention, one may include between 0.25 percent and 10 percent, by weight of all the metal ions including those of the additive present in the composition, of cobalt, manganese, or nickel, calculated as metals, in the garnet compositions. Particularly in the case of cobalt ion, additions as high as 10 percent are beneficial to the properties of the garnet. However, good improvement in resistivity is observed in the synthetic ceramic garnets when between 0.25 percent and 3 percent of the additive metal ions are included in the composition. Similarly, inclusion of even small amounts of the additives, as of between 0.25 percent and 1 percent of the total weight of the metal ions or atoms present, has given excellent improvement in the electrical resistivity.

The percentage of ions of additive material, cobalt, manganese or nickel, to be included within the final composition is, to some extent, dependent upon the calcining temperature. The percentage range discussed in the preceding paragraph results in an end product of the described characteristics over the entire calcining temperature range of from 1000° C. to 1450° C. It has, however, been found that a lower percentage of additive ion of the designated class of materials results in an end product having properties commensurate with those described, providing the composition is calcined over the upper portion of the specified temperature range. Accordingly, use of as little as 0.05 percent and preferably at least 0.1 percent of the total weight of metal ions or atoms present results in a high resistivity product having good physical properties providing calcining is carried out over the temperature range of from about 1300° C. to about 1450° C. As discussed herein, use of such higher calcining temperatures and commensurate firing temperatures results in larger grains within the fired product which is generally advantageous both from the electrical and physical standpoints.

As mentioned above, the positive charge of the added ions is balanced in the garnet composition by oxygen ion. In compounding the materials prior to firing, however, any compounds of cobalt, manganese, or nickel, convertible to the oxide on firing, can be utilized. For example, the carbonates are often used for convenience, and the oxalates, acetates, and so forth are equally suitable. Since firing at an elevated temperature in an oxidizing atmosphere is involved, the metals may be added in either their divalent or trivalent condition, since equilibrium between the two valence states within the crystal will be set up under the conditions of the sintering.

In making up the garnet mixtures prior to firing, appropriate relative amounts of the constituents are weighed out and mixed, with or without a preliminary dry mix, in a paste mixer as a slurry with a liquid in which the solids are insoluble. A ball mill may be used to mix and grind the powdered components. A "Szegvari Attritor" mill, a commercial device utilizing centrifugal forces to aid ball milling, has proved an efficient means for mixing and grinding the ceramic powders here considered. More efficient milling with this apparatus permits cutting of milling time by one-half or two-thirds of the time needed with conventional ball mills. Reagent grade compounds are used. Yttrium and the rare earths are usually commercially available, as the oxides, and high purity ferric oxide is conveniently employed. As before, however, other compounds convertible to the oxides may be used. When starting ingredients which are not soluble in water are used, as is the case with the rare earth, yttrium, and iron oxides, for example, and the carbonates of cobalt, manganese, and nickel, it is convenient to make the slurry an aqueous slurry. However, other non-aqueous liquids can be substituted when water-soluble compounds are used. Such materials are, for example, acetone, alcohols, or carbon tetrachloride.

After thorough mixing, the paste or slurry is freed of excess water by filtration, and the dried material is next calcined in air at a temperature between 1000° C. and 1450° C., depending on the particle size desired in the final product. In general, if a calcining temperature in the higher temperature portion of the above-mentioned range is used, a relatively high final firing temperature will be required, with a given material, to achieve maximum density in the final product. In general also, the higher the calcining and final firing temperature used, the larger will be the grains within the fired product. For example, an yttrium-iron composition calcined at 1100° C. and sintered for 10 hours at 1350° C. to maximum density was made up of particles about 10 microns in size. A similar composition calcined at 1400° C. and sintered to maximum density at 1425° C. for 20 hours consisted of particles more closely averaging 0.5 centimeter in size. The calcination may conveniently continue for between 3 hours and 15 hours, depending on the calcining temperature. The higher the calcining temperature, the less time is required for the same degree of reaction, compared with a sample of the same material calcined at a lower temperature. During the calcination, the component materials of the garnet are, for the most part, completely reacted with one another.

The calcination takes place in an atmosphere of air, oxygen, mixtures of air and oxygen, or in other gaseous oxidizing media.

After calcination, the fired material is broken into particles, as for example by ball-milling for a period of 15 minutes to 15 hours in water, or some other convenient liquid such as ethanol, carbon tetrachloride or acetone. Shorter periods of ball-milling are sufficient with more efficient milling apparatus.

An optional second calcination may be carried out at this point, under the same conditions as the first and followed, like the first, by a ball-milling. Whether a second calcining and grinding follow or not, the calcined product should eventually be brought by milling with a liquid, conveniently water, to the form of a sludge of thick but fluid consistency. For example, such a sludge may comprise one part by volume of solids, ground to an average size of about one micron, mixed with one part by volume of fluid. Ball-milling for the suggested period of time usually produces particles between 0.5 micron and 10 microns in size, which will be suitable for sludge formation. One part by volume of these solids can be mixed with between 0.5 part and 5 parts of fluid, for example, depending on the most convenient consistency for sludge pressing with the equipment used therefor.

The sludge is next formed by conventional pressing techniques into the desired body shape. For example, the material can be pressed in a commercial filter press, such as those manufactured by the Carver Filter Press Company of Summit, New Jersey. Pressures are not critical, so long as a majority of the liquid is expressed, and a solid body which holds its shape is formed.

Shaping methods other than filter pressing may also be employed. For example, the solids may be dry pressed. In this technique, which is known in the ceramic arts, a binder and lubricant are incorporated into the ceramic solids during the ball-milling. Polyvinyl alcohol or "Opal Wax" (hydrogenated castor oil) are useful binders when ball-milling with water, and paraffin or "Halowax" (chlorinated naphthalene) are useful when milling with non-aqueous solvents, such as carbon tetrachloride. The binder may be added either as a solid, in which case it is dissolved by the fluid used in the milling, or already in solution in a solvent. For "Halowax," which is most commonly used, an amount of wax equal in weight to 10 percent of the weight of the ceramic solids has been found to give best results. For the other binders mentioned, smaller quantities are usual.

In the dry press process, the solvent, after milling, may be removed by filtration or by evaporation while the ceramic and binder residue are stirred to assure uniform dispersion of the binder throughout the inorganic mixture. The resultant dried powder is then preferably granulated for ease in pressing. This is conveniently accomplished by forcing the mixture through a sieve, for example, and a No. 20 standard sieve, with a mesh opening of 0.84 millimeter, has been used for this purpose with particularly good results.

Forming of the bodies is then done by compressing the materials in dies, under pressures of from 10,000 to 50,000 pounds per square inch. After forming, the pressed bodies may, at option, be dewaxed by heating at a temperature of about 400° C., after bringing the bodies to temperature over a 6-hour period, or the formed bodies may be fired finally without an intermediate dewaxing step.

After shaping, by sludge pressing, dry pressing, or other conventional techniques, the bodies are given a final firing or sintering in air, oxygen, a mixture of these, or some other oxidizing atmosphere. The final firing temperature may be between 1325° C. and 1500° C. Particularly good results are obtained when the final firing is in the temperature range between 1350° C. and 1450° C. Because of the addition of cobalt, manganese or nickel, or more than one of these, to the composition, excellent resistivity values above $10^{12}$ ohm-centimeters are obtained despite the fact that calcination and final firing may be carried out at temperatures above about 1325° C.

In this temperature range, densities between 4.9 grams per cubic centimeter and 5.1 grams per cubic centimeter can be achieved with firing times between one hour and forty hours. Particularly good results have been obtained with firing times between five hours and twenty-five hours. In general, to fire a given material to a given density, sintering at a temperature high in the aforementioned temperature range will require less time than does sintering at a relatively low temperature.

The method of practicing the invention is shown by the following illustrative examples.

Example 1

One-tenth mol of a synthetic yttrium-iron garnet material containing nickel, of the approximate composition $Y_3Fe_{4.9}Ni_{0.1}O_{12}$, is prepared by mixing 33.8 grams of $Y_2O_3$, 39.1 grams of $Fe_2O_3$, and 1.2 grams of $NiCO_3$ together in a "Szegvari Attritor" mill, with water, for about 10 minutes. The amount of nickel carbonate added is such that the weight of nickel present is 1.1 percent by weight of all metal atoms, including nickel, present in the mixture. The mixed slurry is then filtered to remove excess water, and calcined in air at 1200° C. for 10 hours. The calcine is again ball-milled in the "Attritor" mill, in water, for 20 minutes. An "Opal Wax" emulsion is added before milling is complete. The wax-coated solids are then filtered out from the excess water and dried by exposure to air while stirring. The dried powder is next granulated by forcing through a No. 20 sieve, and then pressed into parts in dies. The parts are dewaxed at 400° C. for 6 hours, after being brought to temperature over a 6-hour period. They are then finally fired in oxygen for 10 hours at a temperature of 1450° C. The bodies have a resistivity greater than $10^{12}$ ohm-centimeters, a density of 5.1 grams per cubic centimeter, and a saturation induction ($4\pi M$) of about 1700 gausses.

Example 2

A synthetic yttrium-iron garnet of the approximate formula $Y_3Fe_{4.9}Co_{0.06}O_{12}$ is prepared in $\frac{1}{10}$ mol quantity by mixing the following ingredients in the following amounts: 33.8 grams $Y_2O_3$, 39.4 grams $Fe_2O_3$, 0.7 gram $CoCO_3$. Based on the weight of all the metal atoms present in the mixture, the mixture contains about 0.6 weight percent of cobalt. The procedural steps used in preparing the sample of Example 1 are followed also with the material of Example 2, except that the ceramic is fired for 10 hours in oxygen at a temperature of 1425° C. The sample has a density of 5.0 grams per cubic centimeter, a resistivity greater than $10^{12}$ ohm-centimeters, and a saturation induction ($4\pi M$) of about 1700 gausses.

Example 3

One-tenth mol of an yttrium-iron garnet containing a small amount of manganese is prepared by mixing 33.8 grams $Y_2O_3$, 39.4 grams of $Fe_2O_3$, and 0.6 gram of $MnCO_3$. In such a mixture, manganese is present as about 0.6 percent by weight of all the metal atoms present in the composition. In the preparation of the synthetic garnet, the procedure outlined in Example 1 is followed, except that the garnet is fired at 1400° C. for 10 hours in oxygen. The fired material has a saturation induction ($4\pi M$) of about 1700 gausses, a resistivity greater than $10^{12}$ ohm-centimeters, and a density of 4.95 grams per cubic centimeter.

Example 4

One-tenth of a mole of an yttrium-iron garnet having the approximate composition $Y_3Fe_{4.9}Mn_{0.05}Co_{0.05}O_{12}$ is prepared according to the procedure described in Example 1. The batch mixture consists of 33.8 grams of $Y_2O_3$, 39.1 grams $Fe_2O_3$, 0.6 gram of $MnCO_3$, and 0.6 gram of $CoCO_3$, in which manganese and cobalt are each present as about 0.6 percent by weight of all the metal atoms in the mixture. The final firing of the sample is carried out for 10 hours in oxygen, at 1425° C. The body has a resistivity greater than $10^{12}$ ohm-centimeters, a saturation induction ($4\pi M$) of about 1700 gausses, and a density of 4.95 grams per cubic centimeter.

Example 5

A one-tenth mol sample of a synthetic rare earth-iron garnet of the approximate formula $Sm_3Fe_{4.9}Ni_{0.1}O_{12}$ is prepared by mixing 52.3 grams of samarium oxide, 39.1 grams of ferric oxide, and 1.2 grams of $NiCO_3$, in which mixture the nickel is present as about 0.8 percent by weight of all the metal atoms present in the composition. The materials are intimately mixed by grinding in a ball mill, and a 10-minute mixing with water in the "Szegvari Attritor" mill mentioned in Example 1 is sufficient. The mixture is then calcined at 1200° C. in air for 10 hours. The calcine is again ball-milled to an average particle size of about 5 microns in the "Attritor" mill by milling for about 20 minutes with a volume of water approximately equal to the volume of solids used. The resulting sluge is then pressed in a filter press, such as a Carver filter press, to form a block. The block is then finally fired in oxygen at a temperature of 1350° C.

Example 6

A synthetic yttrium-iron garnet of the approximate formula $Y_3Fe_{4.99}Co_{0.01}O_{12}$ is prepared in one-tenth mol quantity by mixing the following ingredients in the following amounts: 33.8 grams $Y_2O_3$, 39.8 grams $Fe_2O_3$, 0.12 gram $CoCO_3$. Based on the weight of all the metal atoms present in the mixture, the mixture contains about 0.1 weight percent of cobalt. The procedural steps used in preparing the sample of Example 2 are followed also with the material of this example except that the material is calcined at 1400° C., ball-milled in water, and calcined at 1400° C. again instead of employing the single calcination step at 1425° C. The sample has a density of about 5.0 grams per cubic centimeter, a resistivity greater than $10^{12}$ ohm-centimeters, and a saturation induction ($4\pi M$) of about 1700 gausses.

Example 7

A synthetic yttrium-iron garnet of the approximate formula $Y_3Fe_{4.94}Co_{0.02}O_{12}$ is prepared in one-tenth mol quantity by mixing the following ingredients in the following amounts: 33.8 grams $Y_2O_3$, 39.7 grams $Fe_2O_3$, 0.24 gram $CoCO_3$. Based on the weight of all of the metal atoms present in the mixture, the mixture contains about 0.2 weight percent of cobalt. The procedural steps used in preparing the sample of Example 6 are followed. The example has a density of 5.0 grams per cubic centimeter, a resistivity greater than $10^{12}$ ohm-centimeters, and a saturation induction ($4\pi M$) of about 1700 gausses.

It is to be understood that the specific embodiments described above are illustrative only, and are not to be construed as limiting on the spirit and scope or the invention.

For example, although the invention has been described primarily in terms of compositions made by calcining and firing techniques, the described compositions may be made by coprecipitation (see H. Sorestier and G. Ginot-Guillain, Comptes Rendus, v. 230, page 1884, 1950) and by other applicable methods.

What is claimed is:

1. The method of preparing ceramic garnets from components which react upon firing at a temperature between 1350° C. and 1500° C. to produce garnets selected from the group consisting of yttrium-iron garnets and rare earth-iron garnets which comprises adding to the uncalcined components at least one compound of at least one metal selected from the group consisting of cobalt, manganese and nickel and firing the resultant composition at a temperautre between 1350° C. and 1500° C., the said compound being such that it is converted to the oxide on firing and being an amount such that the metal so added is in the range of between 0.05 percent and 10 percent by weight of the total metal content of the garnet composition.

2. The method of claim 1 in which the said range is from 0.05 percent to 3 percent.

3. The method of claim 1 in which the said compound contains cobalt.

4. The method of claim 1 in which the said compound contains nickel.

5. The method of claim 1 in which the said range is between 0.05 percent and 1 percent and in which the uncalcined components together with addition are successively milled, calcined at a temperature of from 1300° C. to 1450° C., remilled, formed into a body and fired at a temperature of from 1350° C. to 1500° C.

6. A ceramic garnet produced in accordance with the method of claim 1.

7. The method of claim 2 in which the said range is from 0.05 percent to 1 percent and in which the said uncalcined components together with the added compound are successively milled, calcined, remilled and formed into a body prior to firing.

8. The method of claim 5 in which the said range is from 0.1 percent to 1 percent.

References Cited in the file of this patent

UNITED STATES PATENTS

| | | |
|---|---|---|
| 2,565,861 | Leverenz et al. | Aug. 28, 1951 |
| 2,568,881 | Albers-Schoenberg | Sept. 25, 1951 |
| 2,576,456 | Harvey et al. | Nov. 27, 1951 |
| 2,715,109 | Albers-Schoenberg | Aug 9., 1955 |
| 2,736,708 | Crowley et al. | Feb. 28, 1956 |

FOREIGN PATENTS

| | | |
|---|---|---|
| 735,375 | Great Britain | Aug. 17, 1955 |
| 763,494 | Great Britain | Dec. 12, 1956 |
| 525,700 | Canada | May 29, 1956 |

OTHER REFERENCES

Mohr: Chemical Abstracts, vol. 51, col. 7262 (1957).

Pauthenet: Comptes Rendus, vol. 243, pp. 1499–1502 (November 12, 1956).

Economos: J. Amer. Ceramic Soc., July 1955, pp. 241–244.

Maxwell et al.: Physical Reviews, vol. 92, No. 5, December 1, 1953, p. 1120.

Bradley: Ceramic Age, October 1937, pp. 29, 30.